UNITED STATES PATENT OFFICE.

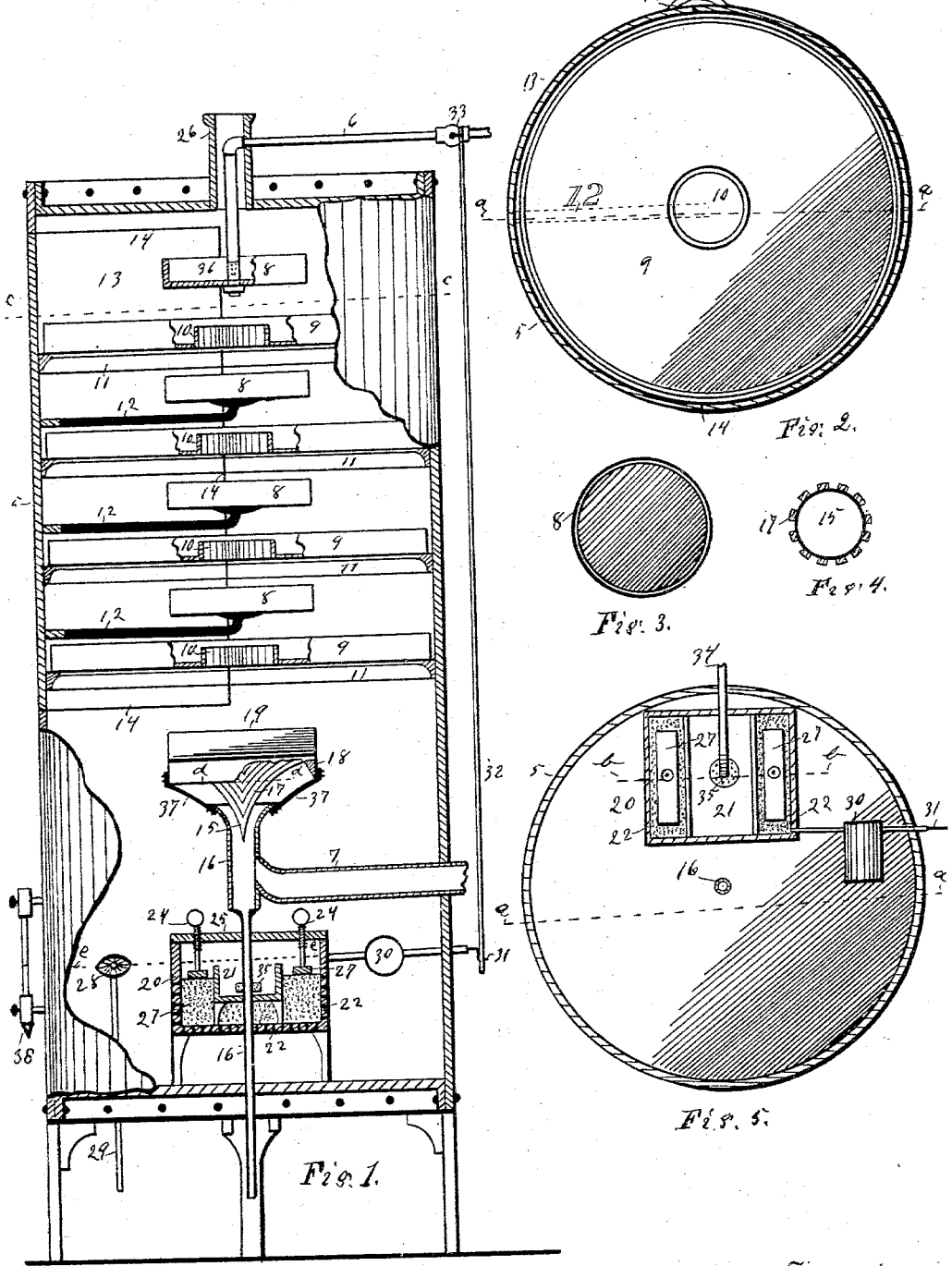

JAMES STANLEY CALKINS, OF HASTINGS, MICHIGAN, ASSIGNOR OF ONE-HALF TO SMITH T. ROSE, OF KALAMAZOO, MICHIGAN.

EXHAUST-STEAM WATER-HEATER.

SPECIFICATION forming part of Letters Patent No. 563,840, dated July 14, 1896.

Application filed March 6, 1896. Serial No. 582,040. (No model.)

*To all whom it may concern:*

Be it known that I, JAMES STANLEY CALKINS, a citizen of the United States, residing at Hastings, in the county of Barry, State of Michigan, have invented a new and useful Exhaust-Steam Water-Heater, of which the following is a specification.

The object of this invention is to present an increased surface of the water-holding vessels or pans for the hot exhaust-steam to come in contact with, and to construct and arrange said vessels or pans in a way to obtain greater amount of heat in a given time.

Another object is to free the exhaust-steam from oil, and to provide an improved means of filtering the water before it goes into the boiler.

Other objects will appear in the following detailed description and claim.

In the drawings forming a part of this specification, Figure 1 is a side elevation of the apparatus with parts in section on dotted lines $a\ a$ and $b\ b$ in Figs. 2 and 5; Fig. 2, a cross-section on line $c\ c$ in Fig. 1, looking from a point above; Fig. 3, a plan of one of the pans in Fig. 1, looking from a point above; Fig. 4, a cross-section on line $d\ d$ in Fig. 1, looking from a point above; and Fig. 5 is a cross-section on line $e\ e$ in Fig. 1, looking from a point above.

Referring to the parts of the drawings pointed out by numbers, 5 is a tank, into the upper end of which the water is passed through pipe 6, and into the side of which near the lower end the exhaust-steam enters through pipe 7. The water-holding vessels or pans are arranged in the tank 5, one over the other, as many as may be desirable, a small one 8 alternating with a larger one 9. The large ones have a central hole through them at 10, beneath the small pans 8, as in Fig. 1, for the purpose explained in the operation. The large vessels or pans 9 rest upon supporting-ledges 11. One of the small pans 8, the first one at the top, is sustained on the lower end of the water-pipe 6, while the next three small pans are supported by arms, one for each, at 12, attached to and projecting inward from the door 13. This door is bounded by line 14 in Figs. 1 and 2, taking about half of the tank in that portion where the pans are located. When the door 13 is opened, the small pans swing out with it on the arms 12.

Just below the bottom large pan 9 is a pendent serrated cone 15, with its small end pointing downward into the mouth of an oil-pipe 16. This cone has V-form serrations 19, with the small end of the V downward, as in Figs. 1 and 4. The top of the cone flanges over at 18, so that all oil which might work up would be stopped by it and run down the serrations and down the pipe 16. 19 may or may not represent a pan, and when it does the flange 18 prevents the water from mixing with the oil by running in the serrations 17.

In the bottom of the tank 5 is a filter 20, and in the filter 20 is a water-box 21. The filter is filled with some suitable material for the purpose 22, and the side and bottom closures of the filter are perforated to let the water in through the filtering material 22. The inner walls of the filter are a little lower than the water-line. The line $e\ e$ will serve to show the water-line.

The filtering material each side of the water-box 21 is held down by presser-bars 23, held adjustably to place by pressure-screws 24, passed through screw-threaded holes in the cover to the water-box and filter. This cover 25 is very important and keeps all the filtered water which passes into the water-box clean.

At 26 is a let-off and skimmer at the surface of the water and is provided with a pipe to carry off the water when the tank would otherwise get too full. The water should rise just high enough to run over into the water-box. The skimmer 28 is like a flattened funnel, lying on its side on the water so that any scum which might be on the surface of the water will run into it.

At 30 is a float having rods attached at each side near one end, which rods have bearings in the side wall of the filter 20 at one end and at the other end in the wall of the tank 5. This rod has a crank 31 at the outer end with which is connected a connecting-rod 32, the upper end of said rod connecting the crank of a valve 33 in the water-pipe 6. By this means when the water gets high enough in the tank the valve will close in the pipe 6, and open if the water gets too low, and thus regulate the supply of water.

The water is drawn from the water-box by a pipe 34, the end of said pipe being provided with a screen 35 in the water-box in the usual way.

In the operation the water which comes into the upper small pan 8, through the holes at 36 in the pipe 6, runs said pan over and the water drips down over the side into the first large pan 9. When this large pan is full enough to run over the flange of the hole 10, it drips down into the next small pan 8, and so on, until it reaches the bottom of the tank 5. The steam from the exhaust entering pipe 7 passes up against the broad bottom surface of the large pan and up through the central hole 10 against the bottom surface of the small pan and around it and on up condensing and heating the pans and the water which it comes into contact with, and goes on up out of the pipe 36 at the upper end of the tank, if it does not all become condensed before that. The exhaust-steam first comes in contact with the serrated surface of the cone 17, depositing the oil therein on its surface, as stated. This cone 17 is held up to place, as here shown, by a series of separated arms 37, attached to it and to the upper end of pipe 16.

At 37 is shown the usual water-gage.

At 38 is shown the hinge to the door or one of them, the other not being shown.

Having thus described my invention, what I claim as new, and desire to secure by Letters Patent of the United States, is—

An exhaust-steam water-heater, comprising the tank, the alternating small and large pans or vessels, the large ones having central flanged holes, and the small ones being supported by arms attached to the door, the cone serrated oil-collector in the path of the incoming steam, and the covered water box and filter, substantially as set forth.

In testimony of the foregoing I have hereunto set my hand in the presence of two witnesses.

JAMES STANLEY CALKINS.

Witnesses:
LOUIS B. BENTLEY,
WM. B. SWEEZEY.